US012356169B2

(12) United States Patent
Liu et al.

(10) Patent No.: US 12,356,169 B2
(45) Date of Patent: Jul. 8, 2025

(54) SPEAKER BOX

(71) Applicant: AAC Microtech (Changzhou) Co., Ltd., Changzhou (CN)

(72) Inventors: Shasha Liu, Shenzhen (CN); Xiaodong Liu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 417 days.

(21) Appl. No.: 18/097,456

(22) Filed: Jan. 16, 2023

(65) Prior Publication Data

US 2024/0073619 A1 Feb. 29, 2024

Related U.S. Application Data

(63) Continuation of application No. PCT/CN2022/128545, filed on Oct. 31, 2022.

(30) Foreign Application Priority Data

Aug. 30, 2022 (CN) ........................ 202211055616.X

(51) Int. Cl.

| | |
|---|---|
| ***H04R 9/06*** | (2006.01) |
| ***H04R 1/02*** | (2006.01) |
| ***H04R 3/00*** | (2006.01) |
| ***H04R 7/12*** | (2006.01) |
| ***H04R 7/18*** | (2006.01) |
| ***H04R 9/02*** | (2006.01) |
| ***H04R 9/04*** | (2006.01) |

(52) U.S. Cl.

CPC ............. *H04R 9/025* (2013.01); *H04R 1/025* (2013.01); *H04R 3/00* (2013.01); *H04R 7/127* (2013.01); *H04R 7/18* (2013.01); *H04R 9/045* (2013.01); *H04R 9/06* (2013.01); *H04R 2400/11* (2013.01)

(58) Field of Classification Search

CPC .......... H04R 1/023; H04R 1/025; H04R 1/06; H04R 1/44; H04R 2209/022; H04R 2400/11; H04R 3/00; H04R 7/04; H04R 7/127; H04R 7/18; H04R 9/025; H04R 9/043; H04R 9/045; H04R 9/06

USPC .......................................................... 381/335

See application file for complete search history.

(56) References Cited

U.S. PATENT DOCUMENTS

| | | | | |
|---|---|---|---|---|
| 11,057,696 B2 * | 7/2021 | Mordechai ............. | H04R 9/043 |
| 2017/0257705 A1 * | 9/2017 | Guo ..................... | H04R 25/402 |
| 2018/0084323 A1 * | 3/2018 | Luce ........................ | H04R 9/06 |
| 2018/0255400 A1 * | 9/2018 | Zheng ...................... | H04R 9/02 |

(Continued)

*Primary Examiner* — Lun-See Lao

(74) *Attorney, Agent, or Firm* — Wiersch Law Group

(57) ABSTRACT

The present disclosure provides a speaker box, including a rear housing with a cavity, an elastic fixing member fixed to the rear housing, and a sound-producing unit supported on the elastic fixing member, an orthographic projection of the sound-producing unit being located in the cavity. The sound-producing unit includes a frame, a vibration system, a magnetic circuit unit, and a front cover defining a front cavity with the vibration system. The magnetic circuit unit includes a yoke, a main magnet, and an auxiliary magnet. The front cover includes a support portion, a cover plate, and a coating portion. The coating portion extends to a periphery of the yoke and completely wraps the auxiliary magnet jointly with the yoke. The elastic fixing member, the yoke, and the coating portion jointly seal the cavity to form a rear cavity.

10 Claims, 4 Drawing Sheets

(56) References Cited

U.S. PATENT DOCUMENTS

| | | | | |
|---|---|---|---|---|
| 2020/0196064 | A1* | 6/2020 | Zhang | H04R 1/023 |
| 2020/0213744 | A1* | 7/2020 | Gu | H04R 9/025 |
| 2023/0283956 | A1* | 9/2023 | Mao | H04R 7/18 381/332 |

* cited by examiner

A-A

B-B

SPEAKER BOX

TECHNICAL FIELD

The present disclosure belongs to the technical field of acoustic electricity, and in particular, relates to a speaker box.

BACKGROUND

Speaker boxes are transducers that convert electric signals into acoustic signals, which are generally applied to small electronic devices that can produce sound, such as mobile phones, notebook computers, and tablet computers.

Existing speaker boxes mainly include a front housing, a rear housing assembled with the front housing to form an accommodation space, a sound-producing unit accommodated in and fixed to the accommodation space, and a metal elastic sheet and support foam that are fixed to the rear housing. The front housing, the rear housing, and the sound-producing unit jointly enclose a rear cavity. The sound-producing unit is fixed to the metal elastic sheet and the support foam. Such a speaker box not only requires the front housing to coordinate with the rear housing and the sound-producing unit to jointly enclose the rear cavity, but also requires the metal elastic sheet and the support foam to elastically support the sound-producing unit jointly. As a result, parts are excessive, the size is excessively large, and the rear cavity has a relatively small space.

In addition, the sound-producing unit includes a frame, a vibration system and a magnetic circuit unit driving the vibration system to vibrate that are fixed to the frame respectively, and a front cover covering the frame and defining a front cavity with the vibration system. A waterproof double-sided adhesive of the front cover can only be affixed to the highest plane thereof for sealing, so that the height of the whole machine is excessively large.

The magnetic circuit unit may be divided into a single-magnetic-circuit structure, a three-magnetic-circuit structure, a five-magnetic-circuit structure, and the like according to actual requirements. The single-magnetic-circuit structure includes a magnetic bowl and a magnet accommodated in and fixed to the magnetic bowl.

Due to requirements for a shape, costs, driving force, and so on, the magnetic bowl of the existing sound-producing unit cannot wrap the magnet when flanging completely, which leads to a lot of leakage of magnetic field. Therefore, in order to reduce shaking of an overall structure caused by the leakage of the magnetic field, glue is further required to be added to a peripheral part of the magnetic bowl, which makes a preparation process of the speaker box complex and time-consuming.

SUMMARY

The technical problem to be solved in the present disclosure is to provide a speaker box that has few parts, a small size, a large space of a rear cavity, and a small height of the whole machine, and can reduce leakage of a magnetic field without requiring the sound-producing unit to add glue to a peripheral part of a yoke.

The present disclosure is implemented as follows. A speaker box is provided, including a rear housing with a cavity, an elastic fixing member fixed to the rear housing, and a sound-producing unit supported on the elastic fixing member and spaced from the rear housing, an orthographic projection of the sound-producing unit being located in the cavity; the sound-producing unit including a frame, a vibration system and a magnetic circuit unit driving the vibration system to vibrate to produce sound that are fixed to the frame respectively, and a front cover covering the frame and defining a front cavity with the vibration system, the frame, the vibration system, and the magnetic circuit unit jointly defining a sound-producing inner cavity; the magnetic circuit unit including a yoke, a main magnet fixed to the side of the yoke close to the vibration system, and an auxiliary magnet spaced from and arranged around the main magnet and jointly defining a magnetic gap with the main magnet, the sound-producing unit being supported on the elastic fixing member through the yoke; the front cover including a support portion in a shape of a ring and fixed to the frame, a cover plate spaced from and opposite to the vibration system, and a coating portion bending and extending from an outer periphery of the support portion to a direction away from the cover plate and in a shape of a ring, a periphery of the cover plate being connected to an inner periphery of the support portion, the cover plate being provided with a first ventilation hole passing therethrough, the coating portion extending to a periphery of the yoke and completely wrapping the auxiliary magnet jointly with the yoke; the elastic fixing member, the yoke, and the coating portion jointly sealing the cavity to form a rear cavity.

Furthermore, an orthographic projection of the coating portion along a vibrating direction perpendicular to the vibration system to the magnetic circuit unit completely covers the auxiliary magnet and at least partially covers the yoke.

Furthermore, the frame is located on the side of the magnetic circuit unit close to the vibration system, and is fixedly connected to the auxiliary magnet.

Furthermore, the coating portion, after bending from the outer periphery of the support portion, is attached to an outer peripheral side of the frame and an outer peripheral side of the auxiliary magnet and extends to the periphery of the yoke.

Furthermore, the cover plate includes a cover plate body spaced from and opposite to the vibration system and an extension wall extending from a periphery of the cover plate body to the support portion and connected to the inner periphery of the support portion; and the first sound hole is arranged on the cover plate body.

Furthermore, the magnetic circuit unit further includes a main pole plate stacked on the side of the main magnet close to the vibration system and an upper clamping plate covering and fixed to the side of the auxiliary magnet close to the vibration system, the frame is fixed to the side of the upper clamping plate away from the auxiliary magnet, and the upper clamping plate is located in a space enclosed by the coating portion; and the upper clamping plate includes a fixed ring in a shape of a ring and fixed to the frame and an auxiliary pole plate horizontally extending from the fixed ring to a direction close to the main pole plate and stacked on the auxiliary magnet.

Furthermore, the vibration system includes a diaphragm fixed to the frame, a voice coil inserted and suspended in the magnetic gap to drive the diaphragm to vibrate, and an elastic member fixed to the frame and opposite to and spaced from the diaphragm; wherein the elastic member is connected to the end of the voice coil away from the diaphragm, and the diaphragm is pressed and fixed to the frame by the support portion.

Furthermore, the diaphragm includes a suspension, a vibration portion extending from an inner periphery of the suspension, a dome affixed to the vibration portion, a fixed portion extending from an outer periphery of the suspension, and a vertical wall bending and extending from the fixed portion to a direction close to the frame; the voice coil is fixed to the side of the vibration portion close to the magnetic circuit unit; the support portion is fixed to the fixed portion, and the coating portion, after bending from the outer periphery of the suspension, extends against the vertical wall toward the periphery of the yoke.

Furthermore, the elastic member is a flexible printed circuit (FPC), two elastic members being provided and respectively arranged on two opposite sides of the frame; each of the elastic members including a first fixed arm fixed to the frame, two second fixed arms respectively fixed to the side of the voice coil away from the diaphragm and electrically connected to the voice coil, and two elastic arms extending from two ends of the first fixed arm respectively to the two second fixed arms and forming a fixed connection; wherein the first fixed arm of one of the elastic members is provided with an introducing portion extending toward a direction away from the voice coil and passing through the coating portion, the introducing portion being configured to introduce an external electric signal to the voice coil.

Furthermore, the elastic fixing member includes a first elastic fixed portion in a shape of a ring and fixed to a peripheral position of the rear housing, an elastic extension portion bending and extending from part of inner peripheries of two opposite sides of the first fixed portion respectively into the cavity, an elastic support portion bending and extending from the side of the elastic extension portion away from the first elastic fixed portion, and a second elastic fixed portion bending and extending from the side of the elastic support portion away from the elastic extension portion and fixed to the rear housing, and the yoke is supported on the elastic support portion.

Compared with the related art, the front cover of the speaker box in the present disclosure includes a support portion in a shape of a ring and fixed to the frame, a cover plate spaced from and opposite to the vibration system, and a coating portion bending and extending from an outer periphery of the support portion to a direction away from the cover plate and in a shape of a ring. Moreover, the coating portion extends to a periphery of the yoke and completely wraps the auxiliary magnet jointly with the yoke. The sound-producing unit is elastically supported on the elastic fixing member through the yoke, and the elastic fixing member, the yoke, and the coating portion jointly seal the cavity of the rear housing to form a rear cavity. That is, the coating portion of the front cover can coordinate with the elastic fixing member and the yoke to seal the cavity of the rear housing to form the rear cavity, and the sound-producing unit can be directly elastically supported through the elastic fixing member, which reduces the arrangement of the front housing and the support foam, simplifies an assembly process, reduces manufacturing costs, further simplifies support design of the sound-producing unit, enlarges the space of the rear cavity, reduces outline dimensions, saves a layout space, and can also affix a waterproof double-sided adhesive to a relatively low plane of the support portion for waterproofing, so as to reduce the height of the whole machine. In addition, the coating portion of the front cover, by coordinating with the yoke, can completely wrap the main magnet and the auxiliary magnet to reduce the leakage of the magnetic field. In this way, the assembly process of the sound-producing unit is simplified without adding glue to the peripheral part of the yoke.

BRIEF DESCRIPTION OF DRAWINGS

In order to more clearly illustrate the technical solutions in embodiments of the present disclosure or the related art, the accompanying drawings used in the description of the embodiments or the related art will be briefly introduced below. It is apparent that the accompanying drawings in the following descriptions are only some embodiments of the present disclosure, and other drawings can be obtained by those of ordinary skill in the art from the provided drawings without creative efforts.

100: sound-producing unit; 1: frame; 2: vibration system; 21: diaphragm; 211: suspension; 212: vibration portion; 213: dome; 214: fixed portion; 215: vertical wall; 22: voice coil; 23: elastic member; 231: first fixed arm; 232: second fixed arm; 233: elastic arm; 234: introducing portion; 3: magnetic circuit unit; 31: yoke; 32: main magnet; 33: auxiliary magnet; 34: main pole plate; 35: upper clamping plate; 351: fixed ring; 352: auxiliary pole plate; 4: front cover; 41: support portion; 42: cover plate; 421: extension wall; 422: cover plate body; 43: coating portion; 5: rear housing; 6: elastic fixing member; 61: first elastic fixed portion; 62: elastic extension portion; 63: elastic support portion; 64: second elastic fixed portion; 7: first air-permeable isolation member; 8: second air-permeable isolation member; 10: front cavity; 20: sound-producing inner cavity; 30: magnetic gap; 40: first ventilation hole; 50: cavity; 60: rear cavity; 70: second ventilation hole.

DESCRIPTION OF EMBODIMENTS

In order to make the objectives, technical solutions, and advantages of the present disclosure clearer, the present disclosure is described in further detail below with reference to the accompanying drawings and embodiments. It should be understood that specific embodiments described herein are intended only to interpret the present disclosure and not to limit the present disclosure.

Figure 1:
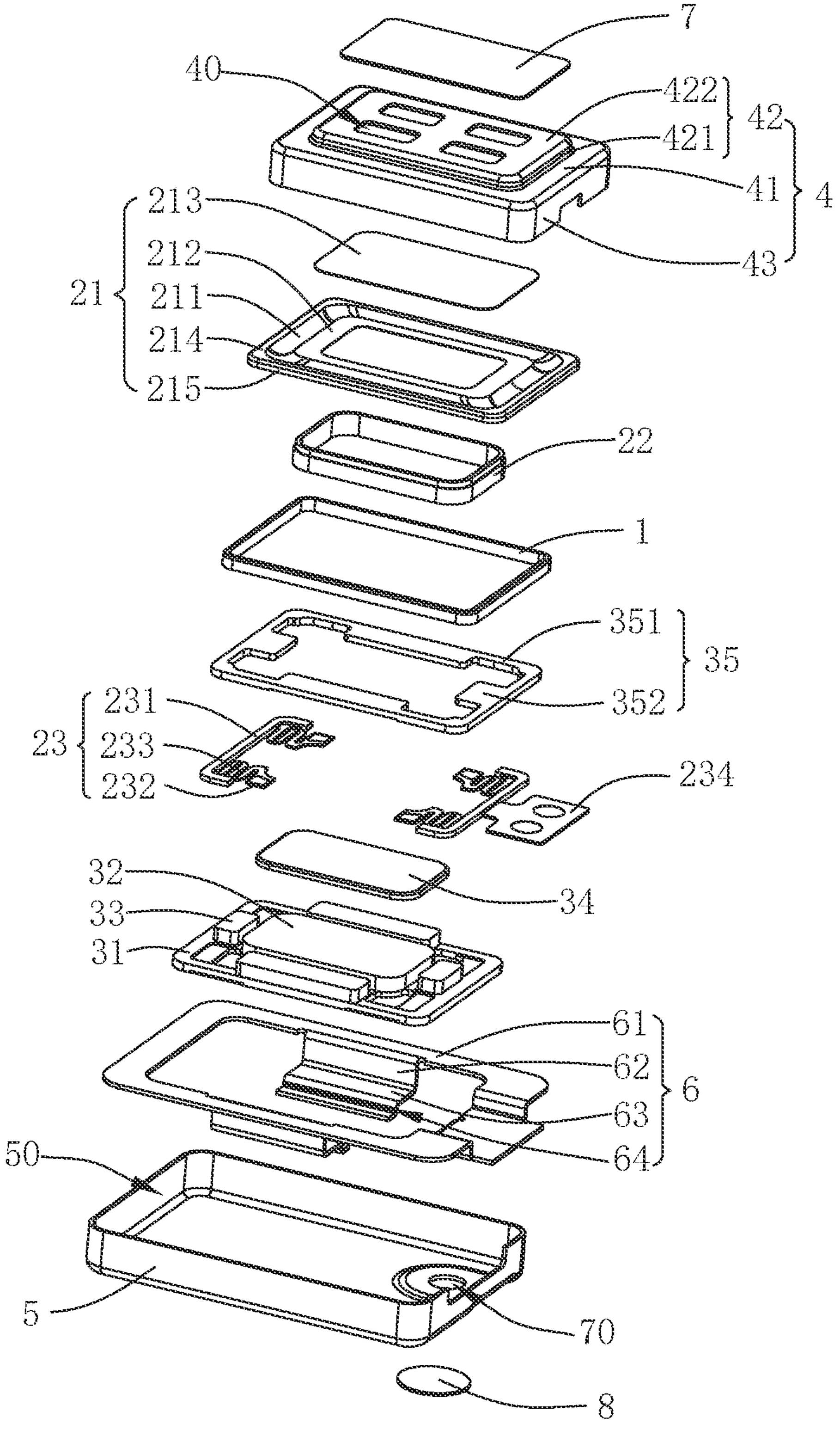
FIG. 1 is a schematic exploded view of a structure of a speaker box according to an embodiment of the present disclosure.
Figure 2:
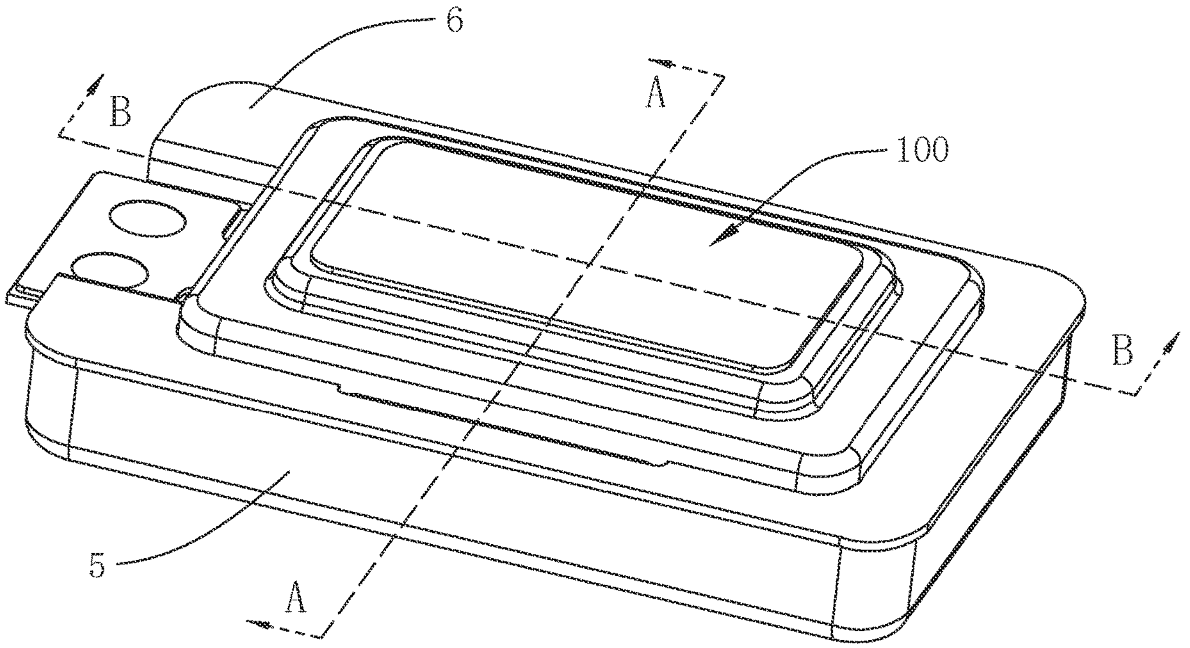
FIG. 2 is a schematic diagram of an overall structure of a speaker box according to an embodiment of the present disclosure.
Figure 3:
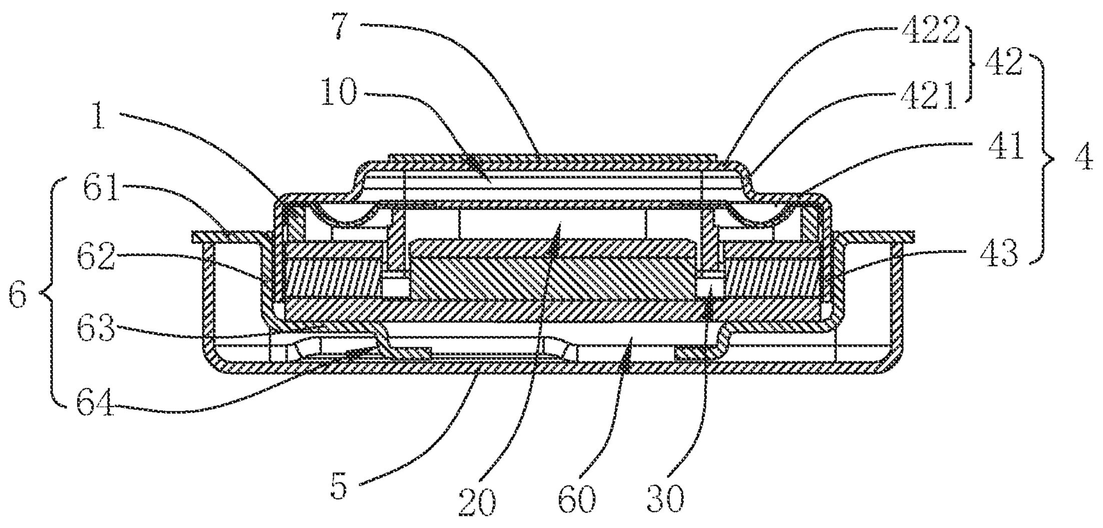
FIG. 3 is a sectional view taken along a line A-A in FIG. 2.
Figure 4:
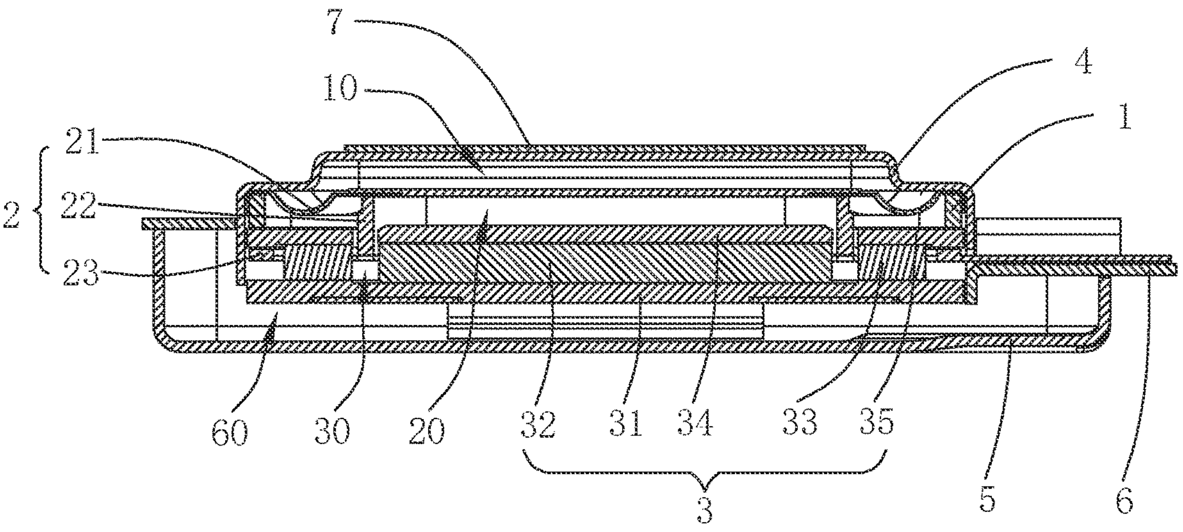
FIG. 4 is a sectional view taken along a line B-B in FIG. 2.

In an embodiment, referring to FIG. 1 to FIG. 4, the present disclosure provides a speaker box, including a rear housing 5 with a cavity 50, an elastic fixing member 6 fixed to the rear housing 5, and a sound-producing unit 100 supported on the elastic fixing member 6 and spaced from the rear housing 5. An orthographic projection of the sound-producing unit 100 is located in the cavity 50. The sound-producing unit 100 includes a frame 1, a vibration system 2 and a magnetic circuit unit 3 driving the vibration system 2 to vibrate to produce sound that are fixed to the frame 1 respectively, and a front cover 4 covering the frame 1 and defining a front cavity 10 with the vibration system 2. The frame 1, the vibration system 2, and the magnetic circuit unit 3 jointly enclose a sound-producing inner cavity 20. The front cover 4 is provided with a first ventilation hole 40 passing therethrough.

As an improvement, the frame 1 is a rectangular frame. Certainly, according to an actual requirement, a frame in another shape, such as an oval frame or a trapezoidal frame, may also be selected.

As an improvement, the vibration system 2 includes a diaphragm 21 fixed to the frame 1, a voice coil 22 inserted and suspended in the magnetic gap 30 of the magnetic circuit unit 3 to drive the diaphragm 21 to vibrate, and an elastic member 23 fixed to the frame 1 and opposite to and spaced from the diaphragm 21.

The elastic member 23 is electrically connected to the end of the voice coil 22 away from the diaphragm 21.

As an improvement, the diaphragm 21 includes a suspension 211, a vibration portion 212 extending from an inner periphery of the suspension 211, a dome 213 attached to the vibration portion 212, a fixed portion 214 extending from an outer periphery of the suspension 211, and a vertical wall 215 bending and extending from the fixed portion 214 to a direction close to the frame 1. The voice coil 22 is fixed to the side of the vibration portion 212 close to the magnetic circuit unit 3.

The front cover 4 encloses the front cavity 10 jointly with the suspension 211, the vibration portion 212, and the dome 213 of the diaphragm 21.

The suspension 211 bends toward a direction away from the front cover 4. In this way, an interval distance between the suspension 211 and the front cover 4 can be increased in a limited arrangement space, that is, a space of the front cavity 10 is increased, to improve acoustic performance of the speaker box.

As an improvement, the elastic member 23 is an FPC. Two elastic members 23 are provided and respectively arranged on two opposite sides of the frame 1. Each of the elastic members 23 includes a first fixed arm 231 fixed to the frame 1, two second fixed arms 232 respectively fixed to the side of the voice coil 22 away from the diaphragm 21 and electrically connected to the voice coil 22, and two elastic arms 233 extending from two ends of the first fixed arm 231 respectively to the two second fixed arms 232 and forming a fixed connection.

The voice coil 22 is of a rectangular structure. The two first fixed arms 231 in each elastic member 23 are respectively fixed to two adjacent corner positions of the voice coil 22. As an improvement, the magnetic circuit unit 3 includes a yoke 31, a main magnet 32 fixed to the side of the yoke 31 close to the vibration system 2, and an auxiliary magnet 33 spaced from and arranged around the main magnet 32 and jointly defining a magnetic gap 30 with the main magnet 32.

Four auxiliary magnets 33 are provided, and are arranged on two opposite sides of the main magnet 32 in pairs. Certainly, only two auxiliary magnets may also be provided according to an actual requirement.

As an improvement, the frame 1 is located on the side of the magnetic circuit unit 3 close to the vibration system 2, and is fixedly connected to the auxiliary magnet 33.

As an improvement, the magnetic circuit unit 3 further includes a main pole plate 34 stacked on the side of the main magnet 32 close to the diaphragm 21 and an upper clamping plate 35 fixed to the frame 1 and covering and fixed to the side of the auxiliary magnet 33 close to the diaphragm 21. The upper clamping plate 35 includes a fixed ring 351 in a shape of a ring and fixed to the frame 1 and an auxiliary pole plate 352 horizontally extending from the fixed ring 351 to a direction close to the main pole plate 34 and stacked on the auxiliary magnet 33.

Four auxiliary pole plates 352 are provided and in one-to-one correspondence to the four main magnets 33.

As an improvement, the frame 1 is fixed to the side of the fixed ring 351 in the upper clamping plate 35 away from the auxiliary magnet 33. That is, the frame 1 is fixedly connected to the auxiliary magnet 33 indirectly.

As an improvement, the first fixed arm 231 of the elastic member 23 is fixed to the side of the fixed ring 351 away from the frame 1. That is, the elastic member 23 is indirectly fixed to the frame 1 through the upper clamping plate 35.

As an improvement, the front cover 4 includes a support portion 41 in a shape of a ring and fixed to the frame 1, a cover plate 42 spaced from and opposite to the vibration system 2, and a coating portion 43 bending and extending from an outer periphery of the support portion 41 to a direction away from the cover plate 42 and in a shape of a ring, and a periphery of the cover plate 42 is connected to an inner periphery of the support portion 41. The coating portion 43 extends to a periphery of the yoke 31 and completely wraps the auxiliary magnet 33 jointly with the yoke 31.

The coating portion 43 extends to the periphery of the yoke 31 and completely wraps the auxiliary magnet 33 jointly with the yoke 31. In this way, the coating portion 43 coordinates with the yoke 31 to reduce leakage of a magnetic field formed by the main magnet 32 and the auxiliary magnet 33, and there is no need to add glue to the peripheral part of the yoke 31, which simplifies a preparation process of the speaker box.

As an improvement, the cover plate 42 includes a cover plate body 422 spaced from and opposite to the vibration system 1 and an extension wall 421 extending from a periphery of the cover plate body 422 to the support portion 41 and connected to the inner periphery of the support portion 41.

The cover plate body 422 is spaced from and opposite to the dome 213, the vibration portion 212, and part of the suspension 211 of the diaphragm 21.

The first ventilation hole 40 is arranged on the cover plate body 422. At the same time, the first ventilation hole 40 is provided with a first air-permeable isolation member 7.

The support portion 41, the extension wall 421, and the cover plate body 422 enclose the front cavity 10 jointly with the diaphragm 21.

The fixed portion 214 of the diaphragm 21 is pressed and fixed to the side of the frame 1 away from the magnetic circuit unit 3 by the support portion 41. That is, the support portion 41 is indirectly fixed to the frame 1 through the fixed portion 214 of the diaphragm 21.

The first fixed arm 231 of one elastic member 23 is provided with an introducing portion 234 extending toward a direction away from the voice coil 22 and sequentially passing through the coating portion 43 and the rear housing 5. The introducing portion 234 is configured to introduce an external electric signal to the voice coil 22.

The upper clamping plate 35 is located in a space enclosed by the coating portion 43.

As an improvement, an orthographic projection of the coating portion 42 along a vibrating direction perpendicular to the diaphragm 21 to the magnetic circuit unit 3 completely covers the auxiliary magnet 33 and at least partially covers the yoke 31. This can better wrap the auxiliary magnet 33 in a space formed by the coating portion 43 and the yoke 31, so as to better reduce the leakage of the magnetic field.

As an improvement, the coating portion 43, after bending from the outer periphery of the support portion 41, is attached to an outer peripheral side of the frame 1 and an outer peripheral side of the auxiliary magnet 33 and extends to the periphery of the yoke 31. That is, in this embodiment, the coating portion 43, after bending from the outer periphery of the support portion 41, extends against the vertical wall 215 of the diaphragm 21 toward the periphery of the yoke 31. In this way, an overall volume of the speaker box can be reduced, and a gap between peripheries of the coating portion 43 and the yoke 31 can be reduced, so as to further reduce the leakage of the magnetic field.

The coating portion 43 can directly extend to the periphery of the yoke 31 and be attached thereto, which can further reduce the gap between the peripheries of the coating portion 43 and the yoke 31, so as to reduce the leakage of the magnetic field furthermore.

As an improvement, the rear housing 5 is provided with a second ventilation hole 70 passing therethrough. At the same time, a second air-permeable isolation member 8 is also arranged at the position of the second ventilation hole 70.

As an improvement, the elastic fixing member 6 includes a first elastic fixed portion 61 in a shape of a ring and fixed to a peripheral position of the rear housing 5, an elastic extension portion 62 bending and extending from part of inner peripheries of two opposite sides of the first fixed portion 61 respectively into the cavity 50, an elastic support portion 63 bending and extending from the side of the elastic extension portion 62 away from the first elastic fixed portion 61, and a second elastic fixed portion 64 bending and extending from the side of the elastic support portion 63 away from the elastic extension portion 62 and fixed to the rear housing 5.

The elastic support portion 63 bends and extends from the side of the elastic extension portion 62 away from the first elastic fixed portion 61, the second elastic fixed portion 64 bends and extends from the side of the elastic support portion 63 away from the sound-producing unit 100, and an extending end thereof further bends and extends toward a direction away from the elastic support portion 63, so as to be stably affixed to a plane where the rear housing 5 is opposite to the yoke. The first elastic fixed portion 61 and the elastic support portion 63 are arranged parallel to each other, and are both perpendicular to a vibrating direction of the vibration system 2.

As an improvement, the sound-producing unit 100 is supported on the elastic fixing member 6 through the yoke 31. That is, the side of the yoke 31 away from the magnetic circuit unit 3 is elastically supported on the elastic support portion 63.

As an improvement, the elastic fixing member 6, the yoke 31, and the coating portion 43 jointly seal the cavity 50 to form a rear cavity 60. That is, the coating portion 43 is respectively attached to an inner periphery of the first elastic fixed portion 61 and an inner side surface of the elastic extension portion 62 in the elastic fixing member 6. In this way, the elastic fixing member 6, the yoke 31, and the coating portion 43 can seal the cavity 50 to form the rear cavity 60.

Compared with the related art, the front cover 4 of the speaker box in the present disclosure includes a support portion 41 in a shape of a ring and fixed to the frame 1, a cover plate 42 spaced from and opposite to the vibration system 2, and a coating portion 43 bending and extending from an outer periphery of the support portion 41 to a direction away from the cover plate 42 and in a shape of a ring. Moreover, the coating portion 43 extends to a periphery of the yoke 31 and completely wraps the auxiliary magnet 33 jointly with the yoke 31. The sound-producing unit 100 is elastically supported on the elastic fixing member 6 through the yoke 31, and the elastic fixing member 6, the yoke 31, and the coating portion 43 jointly seal the cavity 50 of the rear housing 5 to form a rear cavity 60. That is, the coating portion 43 of the front cover 4 can coordinate with the elastic fixing member 6 and the yoke 31 to seal the cavity 50 of the rear housing 5 to form the rear cavity 60, and the sound-producing unit 100 can be directly elastically supported through the elastic fixing member 6, which reduces the arrangement of the front housing and the support foam, simplifies an assembly process, reduces manufacturing costs, further simplifies support design of the sound-producing unit 100, enlarges the space of the rear cavity 60, reduces outline dimensions, saves a layout space, and can also affix a waterproof double-sided adhesive to a relatively low plane of the support portion 41 for waterproofing, so as to reduce the height of the whole machine. In addition, the coating portion 43 of the front cover 4, by coordinating with the yoke 31, can completely wrap the main magnet 32 and the auxiliary magnet 33 to reduce the leakage of the magnetic field. In this way, the assembly process of the sound-producing unit 100 is simplified without adding glue to the peripheral part of the yoke 31.

The above descriptions are merely embodiments of the present disclosure, which are not intended to limit the present disclosure. Any modification, equivalent replacement, improvement, and the like made within the spirit and principle of the present disclosure shall fall within the protection scope of the present disclosure.

What is claimed is:

1. A speaker box, comprising a rear housing with a cavity, an elastic fixing member fixed to the rear housing, and a sound-producing unit supported by the elastic fixing member and spaced from the rear housing, wherein an orthographic projection of the sound-producing unit is located in the cavity; the sound-producing unit comprises a frame, a vibration system, a magnetic circuit unit driving the vibration system to vibrate to produce sound, and a front cover, the vibration system and the magnetic circuit unit are fixed to the frame respectively, the front cover covers the frame and encloses a front cavity with the vibration system, wherein the frame, the vibration system, and the magnetic circuit unit jointly enclose a sound-producing inner cavity;

wherein the magnetic circuit unit comprises a yoke, a main magnet fixed to a side of the yoke adjacent to the vibration system, and an auxiliary magnet spaced from and arranged around the main magnet and jointly encloses a magnetic gap with the main magnet, wherein the sound-producing unit is supported on the elastic fixing member through the yoke;

wherein the front cover comprises a support portion in a shape of a ring and fixed to the frame, a cover plate spaced from and opposite to the vibration system, and a coating portion in a shape of a ring and bending and extending from an outer periphery of the support portion to a direction away from the cover plate, wherein a periphery of the cover plate is connected to an inner periphery of the support portion, the cover plate is provided with a first ventilation hole passing therethrough, the coating portion extends to a periphery of the yoke and completely wrap the auxiliary magnet jointly with the yoke; and wherein the elastic fixing member, the yoke, and the coating portion jointly seal the cavity to form a rear cavity.

2. The speaker box as described in claim 1, wherein an orthographic projection of the coating portion onto the magnetic circuit unit along a vibrating direction perpendicular to the vibration system completely covers the auxiliary magnet and at least partially covers the yoke.

3. The speaker box as described in claim 2, wherein the frame is located on a side of the magnetic circuit unit adjacent to the vibration system, and is fixedly connected to the auxiliary magnet.

4. The speaker box as described in claim 3, wherein the coating portion, after bending from the outer periphery of the support portion, is attached to an outer peripheral side of the frame and an outer peripheral side of the auxiliary magnet to extend to the periphery of the yoke.

5. The speaker box as described in claim 1, wherein the cover plate comprises a cover plate body spaced from and opposite to the vibration system and an extension wall extending from a periphery of the cover plate body to the support portion and connected to the inner periphery of the support portion; and the first sound hole is arranged on the cover plate body.

6. The speaker box as described in claim 3, wherein the magnetic circuit unit further comprises a main pole plate stacked on a side of the main magnet adjacent to the vibration system and an upper clamping plate covering and fixed to a side of the auxiliary magnet adjacent to the vibration system, wherein the frame is fixed to a side of the upper clamping plate away from the auxiliary magnet, and the upper clamping plate is located in a space enclosed by the coating portion; and wherein the upper clamping plate comprises a fixed ring in a shape of a ring and fixed to the frame and an auxiliary pole plate horizontally extending from the fixed ring to a direction adjacent to the main pole plate and stacked on the auxiliary magnet.

7. The speaker box as described in claim 4, wherein the vibration system comprises a diaphragm fixed to the frame, a voice coil inserted and suspended in the magnetic gap to drive the diaphragm to vibrate, and an elastic member fixed to the frame and arranged opposite to and spaced from the diaphragm; and wherein the elastic member is connected to the end of the voice coil away from the diaphragm, and the diaphragm is pressed and fixed to the frame by the support portion.

8. The speaker box as described in claim 7, wherein the diaphragm comprises a suspension, a vibration portion extending from an inner periphery of the suspension, a dome affixed to the vibration portion, a fixing portion extending from an outer periphery of the suspension, and a vertical wall bending and extending from the fixing portion to a direction adjacent to the frame; and wherein the voice coil is fixed to a side of the vibration portion adjacent to the magnetic circuit unit; the support portion is fixed to the fixing portion, and the coating portion, after bending from the outer periphery of the suspension, extends against the vertical wall toward the periphery of the yoke.

9. The speaker box as described in claim 7, wherein the elastic member is a flexible printed circuit (FPC), two elastic members are provided and respectively arranged on two opposite sides of the frame;

each of the elastic members comprises a first fixed arm fixed to the frame, two second fixed arms respectively fixed to the side of the voice coil away from the diaphragm and electrically connected to the voice coil, and two elastic arms extending from two ends of the first fixed arm respectively to the two second fixed arms and forming a fixed connection; and wherein the first fixed arm of one of the elastic members is provided with an introducing portion extending toward a direction away from the voice coil and passing through the coating portion, and the introducing portion is configured to introduce an external electric signal to the voice coil.

10. The speaker box as described in claim 1, wherein the elastic fixing member comprises a first elastic fixing portion in a shape of a ring and fixed to a peripheral position of the rear housing, an elastic extension portion bending and extending from part of inner peripheries of two opposite sides of the first fixing portion respectively into the cavity, an elastic support portion bending and extending from the side of the elastic extension portion away from the first elastic fixing portion, and a second elastic fixing portion bending and extending from the side of the elastic support portion away from the elastic extension portion and fixed to the rear housing, wherein the yoke is supported on the elastic support portion.

* * * * *